(12) United States Patent
Kruglick

(10) Patent No.: US 9,424,583 B2
(45) Date of Patent: Aug. 23, 2016

(54) DIFFERENTIAL TRIALS IN AUGMENTED REALITY

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 57 days.

(21) Appl. No.: 12/579,718

(22) Filed: Oct. 15, 2009

(65) Prior Publication Data

US 2011/0090219 A1 Apr. 21, 2011

(51) Int. Cl.
*G06T 11/60* (2006.01)
*G06T 19/00* (2011.01)
*G06Q 30/02* (2012.01)

(52) U.S. Cl.
CPC ............... *G06Q 30/02* (2013.01); *G06T 11/60* (2013.01); *G06T 19/006* (2013.01)

(58) Field of Classification Search
CPC ............... G06T 11/60; G06T 19/006; H04N 2201/3256; G06Q 30/02
USPC ................................. 345/629–633
See application file for complete search history.

(56) References Cited

U.S. PATENT DOCUMENTS

| | | | |
|---|---|---|---|
| 6,456,237 B1* | 9/2002 | Ruutu et al. | 342/387 |
| 7,542,034 B2 | 6/2009 | Spooner et al. | |
| 2005/0135286 A1* | 6/2005 | Nurminen et al. | 370/310 |
| 2006/0038833 A1 | 2/2006 | Mallinson et al. | |
| 2007/0245338 A1 | 10/2007 | Musha | |
| 2007/0287386 A1* | 12/2007 | Agrawal et al. | 455/67.11 |
| 2008/0084859 A1 | 4/2008 | Sullivan | |
| 2008/0147730 A1 | 6/2008 | Lee et al. | |
| 2008/0270906 A1* | 10/2008 | Reddy | G06F 17/30876 715/733 |
| 2009/0054084 A1 | 2/2009 | Buhrke et al. | |
| 2009/0102859 A1 | 4/2009 | Athsani et al. | |
| 2009/0172551 A1* | 7/2009 | Kane | G06Q 30/02 715/733 |
| 2009/0182807 A1 | 7/2009 | Yamamoto | |
| 2009/0237328 A1 | 9/2009 | Gyorfi et al. | |
| 2009/0322788 A1* | 12/2009 | Sawano | 345/632 |
| 2010/0278510 A1* | 11/2010 | Goossen | G09B 5/125 386/230 |

FOREIGN PATENT DOCUMENTS

| | | |
|---|---|---|
| JP | 2004-350006 | 12/2004 |
| JP | 2005-182350 | 7/2005 |
| KR | 10-2007-0073803 A | 7/2007 |
| WO | 2007/132661 A1 | 11/2007 |
| WO | 2008/019094 A2 | 2/2008 |

OTHER PUBLICATIONS

European Search Report mailed Feb. 14, 2011 in related application No. EP 10150840.6.
Notice from the European Patent Office dated Oct. 1, 2007 concerning business methods.
"Privacy-Enhancing Technologies for Mobile Applications," Accessed at https://www.youtube.com/watch?v=7d6-vyOTJsg, Dated May 5, 2009, pp. 2.
Kim, J., et al., "Augmented Reality Using GPS", proceeding Stereoscopic Displays and Virtual Reality Systems V, vol. 3295, pp. 421-424 (Apr. 30, 1998).

* cited by examiner

*Primary Examiner* — Ke Xiao
*Assistant Examiner* — Jed-Justin Imperial
(74) *Attorney, Agent, or Firm* — Maschoff Brennan

(57) ABSTRACT

Techniques for displaying virtual objects on devices in differential situations are provided. Augmented reality authoring ensures that users have a consistent experience with virtual objects, including augmented reality images, by delivering the same versions of the virtual objects to devices that are close in terms, for instance, of at least distance and/or time. Devices that are not sufficiently close may receive different versions of the virtual object, thus ensuring that the users of devices that are sufficiently near each other do not experience different versions of the virtual object.

21 Claims, 5 Drawing Sheets

DIFFERENTIAL TRIALS IN AUGMENTED REALITY

BACKGROUND

The development of modern websites and advertising authoring often relies on test audiences. In testing website development and layout, for example, some users are presented with one version of the website while other users are presented with a different version of the website. The interaction of the users with the two versions of the website is measured and recorded. This information allows the versions of the website to be evaluated and compared based, for example, on measurements such as user retention and user conversion. Sometimes, users are allowed to experience both versions of the website.

There are other aspects of website testing and advertising authoring that cannot be achieved by simply presenting different versions to different users. In fact, it may be undesirable for an individual to experience both versions of a website in some situations. From the perspective of the website author or from the advertising campaign, allowing users to experience multiple versions of the website or of the campaign can lead to confusion on the part of the users.

For example, one version of the website may include an offer for a product that is different from an offer for the same product on another version of the website. In another scenario, one user may be manipulating or interacting with content in a way that makes no sense to another user that is being presented with an alternate version of the content that may be dramatically different in some way. Augmented reality, where computer-generated content is merged with other content such as images of real world objects displayed on a device, is an example of where confusion may arise when users experience multiple versions of the augmented reality.

Users that experience different versions of an augmented reality can have a fractured user experience—particularly when the two versions are experienced at around the same time. Not only are the users confused, but it can also draw unwanted attention to the differences. Further, this type of confusion and attention could adversely affect brand image.

DETAILED DESCRIPTION

Figure 1:
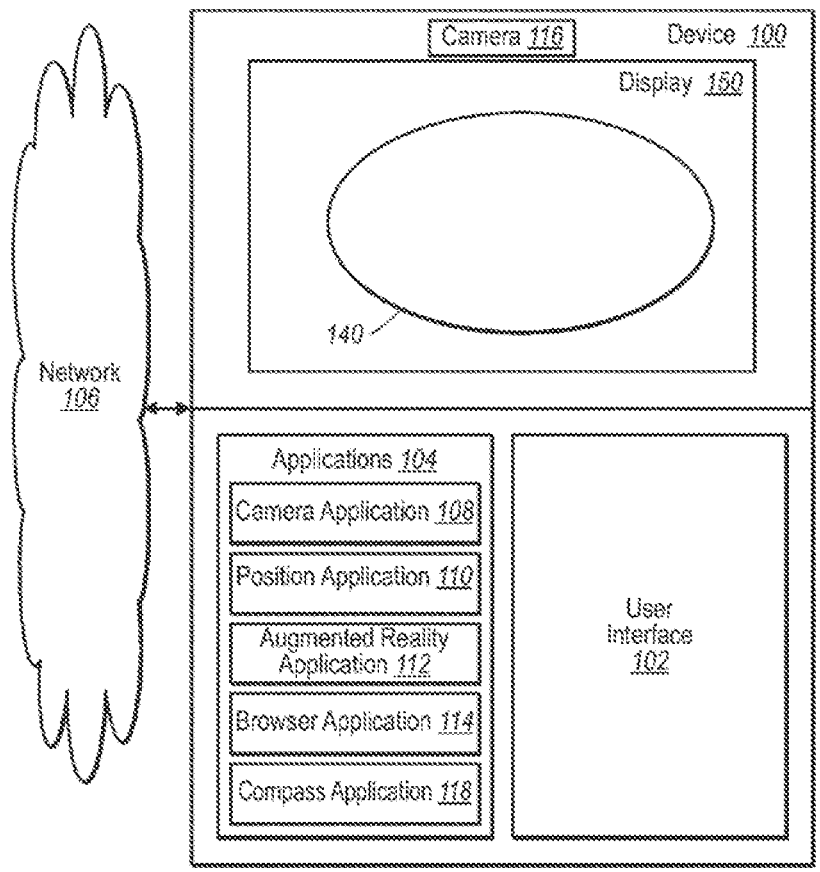
FIG. 1 shows a block diagram of an illustrative embodiment of a device that is capable of displaying a virtual object.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Differential trials in augmented reality authoring relates generally to the process of adding computer-generated content to a view or image of a real world object or to other content to create and display a virtual object such as an augmented reality image. The computer-generated content is effectively merged or superimposed or otherwise displayed with the image of the real world object to create the augmented reality image.

Augmented reality authoring can be used in multiple scenarios and situations and may be performed in real-time or substantially real-time. Everyday objects, for example, can be digitally augmented with computer-generated content while the objects are being displayed. In addition, augmented reality images can change from one moment to the next. The augmented reality image that is generated when computer-generated content is merged with the data received from a device's camera can change as the device moves and as additional computer-generated content is received to update or replace existing computer-generated content in the augmented reality image.

Augmented reality may be used, by way of example only and not limitation, in advertising campaigns and in supporting the completion of various tasks or jobs. For instance, augmented reality can be used to include information on a display to aid in the completion of a job. A mechanic, for example, may see a screen of a car engine that has been augmented with labels for the engine components or instructions. Augmented reality may also be used for navigation purposes, military and emergency services, tourism, employment or the like or any combination thereof.

Embodiments described herein relate to augmented reality authoring and, in particular, techniques for displaying virtual objects by controlling the distribution of computer-generated content that is merged with images of real world objects or with other content. Computer-generated content can be delivered to devices while ensuring that users of those devices that are near to each other in terms of location and/or time have similar experiences with the augmented reality images or other augmented content.

Users that are sufficiently separated in terms of location, distance and/or time can have different experiences with augmented reality images. Some users may view one version of an augmented reality image and other users may view a different version of the augmented reality image. Accordingly, this allows websites and advertising campaigns to be differentially tested while avoiding the situations that can adversely impact the outcome.

As previously described, the augmented reality image may be an image of a real world object displayed on a device that is merged, overlaid or otherwise combined or displayed with computer-generated content. Other examples of virtual objects include images where the computer-generated content is merged with other computer-generated content. A website, for example, can be merged with additional computer-generated content from other servers. Virtual objects can be static, dynamic, or change in response to changes in the user's location or position of the user's device. The computer-generated content can include a model, image data, an interaction script, audio data, video data, text data, or the like or any combination thereof. The computer-generated content can be delivered at one time, streamed, in response to user input at the device, or the like.

FIG. 1 shows a block diagram of an illustrative embodiment of a device 100 that is capable of displaying a virtual object 140. The device 100, by way of example only, includes a display 150, a user interface 102, applications 104, and a camera 116. Examples of the device may include, but are not limited to, a cellular telephone, a smartphone, a laptop computer, a netbook, a desk top computer, an audio and/or visual device (e.g., an mp3 player with a camera for pictures and video), a kiosk terminal, head-up displays, personal display glasses, or the like or any combination thereof. In some instances, the display 150 may be part of the user interface 102—such as in touch screen devices or the like. The device 100 may also have the ability to communicate over one or more networks represented by a network 106 (e.g., cellular network, 802.11x networks, BlueTooth, etc.).

The applications 104 can be pre-loaded on the device 100, downloaded to the device over the network 106, and/or transferred to the device 100 when docked to another device such as a computer, removable memory device, or the like. The applications 104 can provide functionality to the device 100 that can be invoked automatically by the device 100 or by a user of the device 100. The applications 104 may also be enabled to interact with one or more other applications 104 automatically or in response to user input.

The applications 104 may include a camera application 108, which allows the device 100 to take pictures and/or video (with audio) with the camera 116. A positioning application 110 can determine a location of the device 100 using, by way of example only, information from cellular towers, user input, Global Positioning System (GPS) data, or the like or any combination thereof. A browser application 114 may allow the device 100 to access and connect with other devices and/or servers over the network 106. The browser application 114 may also be used to transmit and/or receive data communicated over the network 106. A compass application 118, which may be configured to provide or detect an orientation of the device 100 in multiple dimensions in addition to identifying directions, could provide additional information about how the device 100 is oriented.

An augmented reality application 112 included in the applications 104 may interact with the positioning application 110 and/or the camera application 108 or other applications on the device 100. For example, the augmented reality application 112 can add content, including computer-generated content, to an image displayed in the display 150. By way of example, when the device 100 is displaying a web page on the display 150, the augmented reality application 112 can add other content to the web page displayed in the display 150. By way of another example, when the device 100 is presenting data from the camera 116 on the display 150, the augmented reality application 112 can add content to the camera image being displayed on the device 100.

The content received by the augmented reality application 112 can be overlaid on top of the image in the display 150, merged with the image on the display 150 or the like or otherwise presented the content in the display 150. Example techniques for merging content with an image on the display 150 include layering the content with the image in accordance with HTML layering techniques. The device 100 and, in particular, the applications 104 (e.g., the browser application 114) may be configured to support layering using well known coding techniques. In augmented reality images, the augmented reality application 112 may work with the browser application 114 to ensure that the computer-generated content is the top layer in the virtual object. In addition, the position of the computer-generated content may be adjusted as the underlying image of the real world object moves or changes.

For example, the device 100 may display an image of a landmark using the camera application 108. The computer-generated content may include a text description of the landmark with an arrow pointing to the landmark. The augmented reality application may receive the computer generated content and cause the computer-generated content to be included in the image of the landmark to produce an augmented reality image. Using information from the position application 110 and the compass application 118, the augmented reality application 112 can appropriately place the computer-generated content in the image of the landmark. As the device moves, the computer-generated content may also move and thus continue to point to the landmark in the image of the real world object. This can be achieved, for example, using information from the position application 110 and/or the compass application 118 to adjust the position of the computer-generated content.

Only five applications are shown in FIG. 1 for simplicity and one skilled in the art will appreciate that the device 100 may include a different number of applications. Some of the applications may perform multiple functions.

Figure 2:
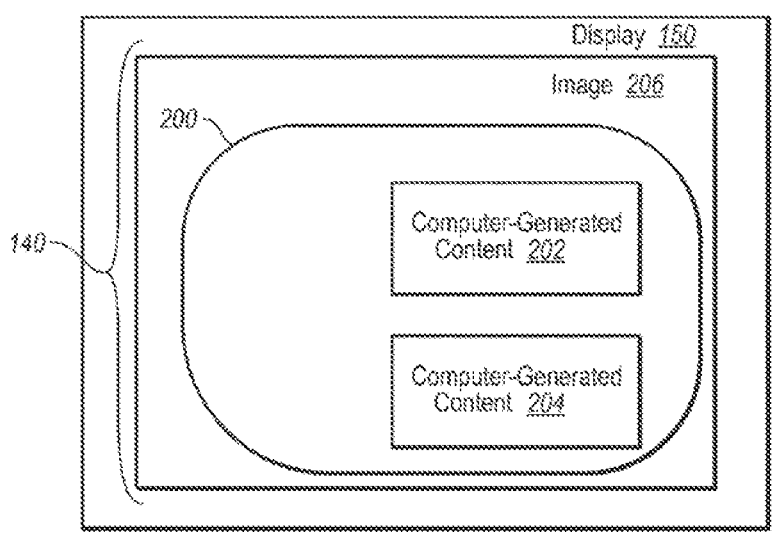
FIG. 2 shows a block diagram of an illustrative embodiment of a virtual object presented on a display of the device.

FIG. 2 shows a block diagram of an illustrative embodiment of the virtual object 140 that is presented on the display 150 of the device 100. The display 150 may be displaying an image 206 of a real world object 200 that has been mixed (e.g., merged, layered, or otherwise combined) with computer-generated content 202 and computer-generated content 204. In one example, the image 206 may be a direct or indirect view of the real world object 200. As a result, the virtual object 140 presented in the display 150 may be an augmented reality image because the image 206 is mixed with the computer-generated content 202 and/or 204. The virtual object 140, however, may also include a web page or other type of data that is mixed with the computer-generated content 202 and/or 204.

The image 206 may correspond to the data generated by the camera 116. Thus, the virtual object 140 may include a direct or indirect image of the real world object 200 that is mixed with the computer-generated content 202 and 204. For example, the camera 116 may display an image of a street. The augmented reality application 112 can obtain computer-generated content that may identify the street name or that may identify businesses on the street. This computer-generated content can be mixed with the image of the street to provide the computer-generated content in the context of the image of the street.

The user is thus able to view an augmented reality image of the street that may include the name of the street or other information included in the computer-generated content. In one embodiment, the computer-generated content may include audio data that can be played by the device as well. For example, the device may audibly output the name of the street.

In another example, an image of a sporting event may be mixed with computer-generated content that includes scores from the sporting event or of other sporting events and/or with advertisements that may be of interest to the user of the device.

Thus, the computer-generated content 202 and/or 204 can be specific to the device 100, to a user of the device 100, and/or to the real world object 200. For instance, the position application 110 may be able to determine a location of the device 100. The location of the device 100 can be used alone or in combination with other data to determine the computer-generated content 202 displayed on the device 100 and mixed with the object 200 in the image 206. In some instances, the computer-generated content is delivered to the device 100 from a server. Alternatively, the computer-generated content may already be stored on the device 100.

When the virtual object 140 is an augmented reality image, examples of information that may be used to determine the computer-generated content 202 and/or 204 include, but are not limited to, the location of the device 100, locations of other devices that may be displaying the same real world object 200, a time at which the real world object 200 is displayed on the device 100 and/or by other devices, an orientation of the device 100, or the like or any combination thereof.

Figure 3:
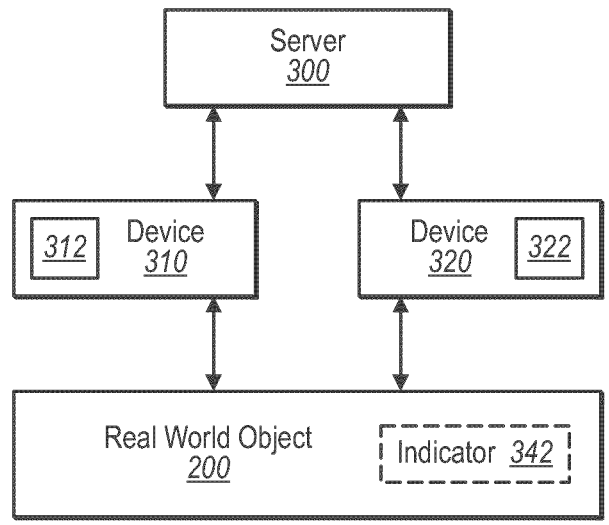
FIG. 3 shows an illustrative embodiment of generating virtual objects for multiple users.

FIG. 3 shows an illustrative embodiment of generating virtual objects for multiple users. FIG. 3 illustrates a device 310 and a device 320, which are examples of the device 100. In this example, the device 310 and the device 320 are each interacting with the real world object 200 and are displaying, respectively, a virtual object 312 and a virtual object 322. The real world object 200 can be the same real world object for each of the device 310 and the device 320 and can be any object as previously described.

For example, the device 310 and the device 320 may be using their respective cameras to take a picture or video of the real world object 200. The real world object 200 can thus be an event, a location, a person, a thing, or any other object that can be captured by the cameras of the devices 310 and 320 or displayed on the displays of the devices 310 and 320.

When the device 310 interacts with the real world object 200, an image of the real world object 200 is presented on the display of the device 310. For example, a user of the device 310 may be viewing the image of the real world object 200 on the display of the device 310 using the camera of the device 310. A user of the device 320 may be similarly viewing the image of the real world object 200 on the display of the device 320.

In generating the virtual object 312, the device 310 may determine its location (e.g., using GPS data, data from cellular towers, or the like) and provide its location to a server 300. The device 310 may also provide other information such as a time at which the object 200 is displayed and/or an orientation of the device 310. Alternatively, the time may be associated with a location of the device 310 and/or the object 200.

At about the same time, the server 300 may also receive similar information from the device 320. The server 300 can then provide computer-generated content to the device 310 and to the device 320 based on the respective locations of the devices 310 and 320 in this example. The server 300 may use the location information received from the devices 310 and 320 to select the computer-generated content that is delivered to the devices 310 and 320 and that is included in the virtual objects 312 and 322. As previously stated, the computer-generated content is mixed with the respective images displayed on the devices 310 and 320 to create the virtual objects 312 and 322, which may be augmented reality images.

In another example, the server 300 may receive the location of the device 310. At a later time, the server 300 may receive the location of the device 320. The device 310 is thus separated from the device 320 by time, even if the locations of the devices 310 and 320 are relatively near to each other. The computer-generated content merged with the images displayed on the devices 310 and 320 may be different in this example.

Figure 4:
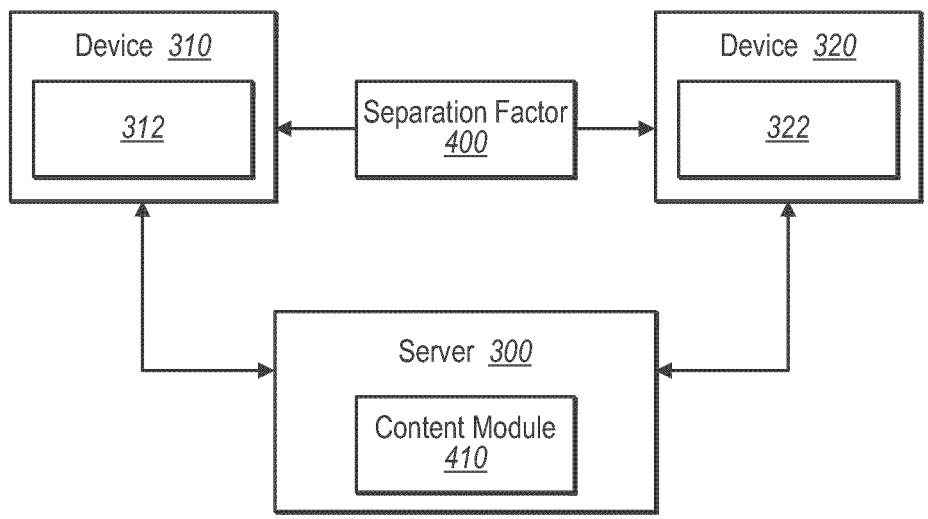
FIG. 4 shows an illustrative embodiment of a server using information received or inferred from devices in selecting computer-generated content for inclusion in the virtual objects displayed on the devices.

FIG. 4 shows an illustrative embodiment of the server 300 using information received or inferred from the devices 310 and 320 in selecting the computer-generated content for inclusion in the virtual objects 312 and 322 displayed on the devices 310 and 320. FIG. 4 can also be used to illustrate differential testing of advertising authoring or website creation.

The server 300 receives information from the device 310 and from the device 320. The information can include the respective locations of the devices 310 and 320, the respective times at which the devices 310 and 320 display the object 200, or the like. In some examples, this information is collected in a manner that does not actually reveal the actual location of the device 310 to the device 320 and vice versa.

The server 300 evaluates the information to determine a separation factor 400 between the device 310 and the device 320. For example, the separation factor 400 can be determined by comparing the information received from the device 310 with the information received from the device 320. The separation factor 400 can express or indicate a separation between the device 310 and the device 320 (and/or between users of the devices 310 and 320) in terms of at least one of distance and time. The separation factor 400 may thus express the distance between the device 310 and the device 320 and/or the amount of time between when the device 310 displays the object 200 and when the device 320 displays the object 200.

Once the separation factor 400 is determined, the separation factor 400 can then be compared to a separation threshold stored, for example, by the server 300. A result of this comparison may be used to determine the computer-generated content delivered to the devices 310 and 320. For example, when the separation factor 400 is less than the separation threshold, the same computer-generated content may be delivered to both the device 310 and the device 320. As a result, the version of the virtual object 312 displayed on the device 310 is the same as or substantially similar to the virtual object 322 displayed on the device 320. In this case, the separation factor 400 suggests that the device 310 and the device 320 (and/or the users thereof) are close enough in terms of distance and/or time to indicate that delivering different computer-generated content to the devices 310 and 320 may result in a fractured user experience.

For example, a user of the device 310 may be able to view the virtual object 322 being displayed on the device 320. When the virtual object 322 is different from the virtual object 312 being displayed on the device 310, the user of the device 310 may be confused and have a fractured user experience.

In another example, the separation factor 400 may be below the separation threshold and the device 310 and the device 320 may be displaying different objects. In this example, the computer-generated content may include advertisements. Thus, the server 300 ensures that the advertisements delivered to the devices 310 and 320 are the same—even though the real world objects displayed on the devices 310 and 320 are different in this example.

When the separation factor 400 is greater than the separation threshold, then the server 300 can provide the same computer-generated content or different computer-generated content to the devices 310 and 320. The separation factor 400, when greater than the separation threshold, can give some assurance that the user of the device 310 will not view the virtual object 322 displayed on the display of the device 320 and that the user of the device 320 will not view the virtual object 312 displayed on the display of the device 310. The separation factor 400 can be used in this manner to provide some assurance that the users of the devices 310 and 320 do not have a fractured user experience by viewing different versions of the virtual object or different versions of the computer-generated content that is mixed with an image of a real world object. For example, if a user of the device 310 sees the virtual object 312 and the virtual object 322 at substantially the same time and if the virtual object 312 and if the virtual object 322 includes different computer-generated content, then the user of the device 310 may have a fractured user experience.

The computer-generated content included in the virtual objects 312 and 322 presented on the displays of the devices 310 and 320 may be generated in real-time or quasi real-time and, as previously indicated, may have some relationship to the object 200, or to the locations of the devices 310 and 320, or the like. The relationship between the object 200 and the virtual objects 312 and 322 presented on the devices 310 and 320 can be provided by the user, determined from the location and/or orientation of the device, determined from an analysis of the images of the object 200, or the like or any combination thereof. For example, a user visiting a landmark may make a query about the landmark via the device. This query, in addition to the location of the user's device, may be provided to the server 300. The computer-generated content returned to the device may be mixed with the image of the real world landmark presented on the display of the device. The compass application 118 can be used to determine an orientation of the device relative to the landmark and thus position the computer-generated content at the correct place in the virtual object.

The object 200, for instance, may include a visual indicator 342 (as shown in FIG. 3) that can be detected by the augmented reality application 112 in the image of the object 200. The visual indicator 342 in effect serves as a link or Uniform Resource Locator (URL) that the augmented reality application 112 can select. In this example, the indicator 342 allows the devices 310 and 320 to contact the server 300 for information related to the object 200. More specifically, the indicator 342 can direct a request to for specific information. The information identifying the object 200 and its context may be identified to the server 300 when the indicator 342 is selected. In one example, the indicator 342 may identify or specify the computer-generated content to be delivered to the devices 310 and 320 while the server 300 may determine how the computer-generated content is displayed on the devices 310 and 320.

For example, the object 200 may be a print advertisement for a movie. When the user of the device 310 views the object 200 using the device's camera, the indicator 342 is detected by the augmented reality application 112. The indicator 342 is sent to the server 300 and then used by the server 300 to deliver computer-generated content to the device 310 that includes an advertisement for discounted tickets. When the device 320 is nearby, the device 320 may receive the same or a different computer-generated content.

The computer-generated content delivered to the device 320 can depend on several factors. For example, if the users of the devices 310 and 320 are viewing the same object 200 in different locations, then the computer-generated content delivered to the device 310 may differ from the computer-generated content delivered to the device 320. For instance, the virtual object 312 presented on the device 310 may include computer-generated content that reflects a ten percent discount. The virtual object 322 presented on the device 320, when the devices 310 and 320 are separated by a distance that exceeds the separation factor 400, may include computer-generated content that reflects a buy one ticket get one ticket free offer for the same movie at the same theater. In other words, embodiments enable the server 300 to account for the object 200 in delivering the computer-generated content as well as the location of the devices 310 and 320. One of skill in the art, with the benefit of the present disclosure can appreciate that the computer-generated content can vary widely for many different objects and scenarios.

In contrast, when the separation factor 400 does not exceed the separation threshold, the server 300 may infer from the locations that the devices 310 and 320 are displaying the same object 200 at the same location. As a result, the server 300 may deliver the same computer-generated content to both of the devices 310 and 320. This ensures that the user of the device 310 does not have a fractured user experience if he or she views the virtual object 322 displayed on the device 320.

The server 300 may also deliver a tracking cookie to each of the devices 310 and 320 in the computer-generated content, allowing the server 300 to track at least the locations of the devices 310 and 320. The mobility of the devices 310 and 320 suggests that the separation factor 400 can change over time. As a result, the server 300 and/or the devices 310 and 320 themselves may control which computer-generated content is presented according to how the separation factor 400 compares to the separation threshold over time.

For instance, the server 300 and/or the devices 310 and 320 may monitor the separation factor 400 over time. When a status of the separation factor 400 changes from exceeding the separation threshold to being below the separation threshold, or vice versa, settings at the server 300 and/or the devices 310 and 320 determine whether to change the computer-generated content.

More specifically, while the separation factor 400 may exceed the separation threshold at a particular instant in time, the separation factor 400 may fall below the separation threshold at a later time. In this case, settings at the server 300 may be used to determine the computer-generated content that is then delivered to the devices 310 and 320. In one example, the settings may indicate that the device 310 is to continue to receive the same computer-generated content that it previously received when the separation factor 400 exceeded the separation threshold. Alternatively, the server 300 may look for an opportunity to change the computer-generated content included in the virtual object 312 when the separation factor 400 falls below the separation threshold. The settings can be determined, for example, by an author of an advertising campaign or automatically by default.

The ability to display virtual objects can be expanded to multiple users. The server 300 can determine the separation factor for multiple devices and control, for example, an advertising campaign or website test, or the like accordingly. The server 300 can deliver different computer-generated content to devices 310 and 320 (or to multiple devices) based on the separation factor or based on an analysis of multiple separation factors.

Determining which computer-generated content to deliver to the devices 310 and 320 can be achieved by tracking the locations of the devices 310 and 320 as previously described.

As previously described, the locations of the devices 310 and 320 can also be associated with times indicating when the devices 310 and 320 are at the respective locations and/or with objects displayed on the devices 310 and 320. As a result, determining which computer-generated content to deliver to the devices 310 and 320 may have both time and location components.

More specifically, the separation factor 400 can be expressed in terms of distance. By determining the location of the devices 310 and 320, the server 300 can determine the distance between the devices 310 and 320. When the devices 310 and 320 are sufficiently separated (e.g., the distance exceeds the separation threshold), the virtual objects 312 and 322 can be different. This ensures that the users of the devices 310 and 320 do not have a fractured experience with the virtual objects.

In another example, the separation factor 400 can be expressed in terms of time. In this example, the devices 310 and 320 may both interact with the same object 200 or be at substantially the same location, but at different times. As a result, the devices 310 and 320 are sufficiently separated by time such that the device 310 can experience one version of the virtual object 140 while the device 320 can experience another version of the virtual object 140. In other words, the difference in time exceeds the separation threshold and the server 300 may deliver computer-generated content to the device 310 that is different from the computer-generated content delivered to the device 320 based on the times at which the devices 310 and 320 interacted with the virtual object 140 and/or are at substantially the same location.

The server 300 may also include a content module 410 that is stored on a storage device accessible to the server 300. The content module 410 may cause the server to receive information from devices such as locations of the devices and times associated with the locations of the devices. The content module 410 may then determine and monitor the separation factors associated with the devices. For instance, the content module 410 of the server 300 may track the locations of two devices and then monitor their locations over time. The information received from the devices is used to determine the computer-generated content that is delivered to the devices. As discussed previously, devices whose separation factor is below the separation threshold may receive the same or substantially the same computer-generated content while devices whose separation factor exceeds the separation threshold may receive different computer-generated content. Because the separation factor may change over time, the computer-generated content delivered to the devices may also change accordingly.

Figure 5:
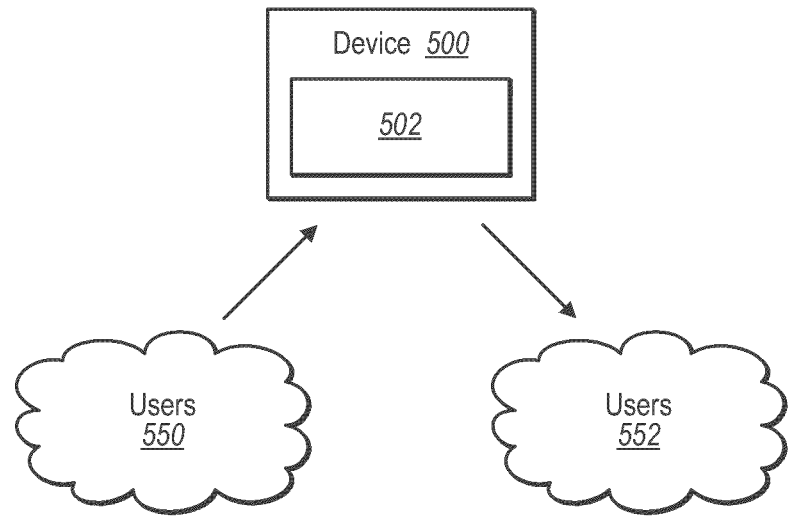
FIG. 5 shows an illustrative embodiment of generating virtual objects at a device.

FIG. 5 shows an illustrative embodiment of generating virtual objects at a device 500. The device 500, which may also be an example of the device 100, may be a virtual kiosk that presents a virtual object 502. In this case, users 552 may have been using the device 500 and have recently finished viewing or interacting with the virtual object 502. The users 552 may have been presented with one version of the virtual object 502.

The device 500 may detect or determine that the users 552 are leaving the vicinity of the device 500 and that users 550 are approaching the device 500. If it is determined that no-one is watching or that the users 552 are sufficiently far away, the device 500 may present a second version of the virtual object 502 to the users 550. By way of example, the device 500 can determine that the users 552 are leaving when their interaction with the device 500 terminates or when the device 500 has access to location information of the users 552 or to one or more devices used by the users 552 (e.g., the device 500 can use location information of the users 552 or of devices in possession of users 552 or a combination thereof to determine whether the users 552 are leaving the vicinity of the device 500).

In this case, the separation factor can be inferred even if the locations of the users 550 and 552 are not known. For example, the separation factor can be defined according to lulls in traffic at the device 500 or lack of input at the device 500. When no input is received for a predetermined amount of time (which becomes the separation factor), the device 500 (or a server, such as the server 300 to which the device 500 is connected) may compare the separation factor to a separation threshold to determine whether the users 552 are sufficiently separated from the users 550 in terms of time and/or distance.

In another example, the device 500 may track average traffic levels. Average traffic levels can be used to determine which version of the virtual object 502 to present in order to meet certain or random distribution goals. For example, if designers of the virtual object 502 want a first version of the virtual object 502 to be presented at the device 500 ten percent of the time, the device 500 may not present the first version of the virtual object 502 during times that are associated with sufficiently significant traffic in order to satisfy the distribution goals.

In another example, the version of the virtual object 502 may change based on time. After the users 552 view a version of the virtual object 502, the virtual object 502 may change to another version. Then, the device 500 or the server 300 may change the virtual object 502 to the version that was previously displayed to the users 552 when the users 552 reapproach. The separation factor can be defined in terms of time—even when location data is unavailable. In this case, the time may correspond to a time period that corresponds to times when the users 552 are expected to encounter the virtual object 502.

For example, the users 552 may be involved in an activity where they are likely to be in substantially the same location after some period of time. This period of time may be known in advance or can be determined from other sources. For example, the server 300 may query other servers for information related to schedules (e.g., event start/end times, transportation schedules, open/close times, or the like). The virtual object 502 can then be managed such that the users 552 are presented with the same version of the virtual object 502 according to the period of time.

For example, the users 552 may enter an event (e.g., a movie) and view the virtual object 502 as they enter the event. When the event is over, the users 552 are likely to exit the event and view the virtual object 502. In this example, the length of the movie may determine the time period used in determining which version of the virtual object 502 is displayed. The device 500 (or the server 300) can use this information to ensure that the same version of the virtual object 502 is presented or displayed to the users 552 by the device 500 (or by the devices 310 and 320) when the users 552 enter/exit the event. While the event is occurring of after a determination is made that the users 552 have left the event, other versions of the virtual object 502 may be displayed.

A similar scenario may occur when the users 552 are commuting using a service such as public transportation. In this case, the version of the virtual object 502 displayed by the device 500 (or presented on the device 310 or 320) may correspond to the anticipated commute times or based on a schedule. As a result, the users 552 may view the same version of the virtual object 502 during both directions of their commute.

The server 300, or the devices 310, 320, and/or 500, can use information that is available (e.g., locations, times, events, schedules) when determining the computer-generated content to include the virtual objects. Some of this information may be received from the devices 310, 320, and/or 500 themselves, or from other available sources that are not directly related to the devices 310, 320, and/or 500 such as other servers.

Figure 6:
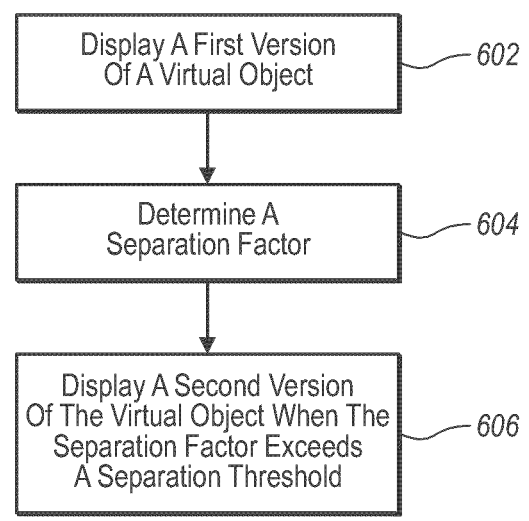
FIG. 6 is a flow diagram of an illustrative embodiment of a method for presenting a virtual object to users.

FIG. 6 is a flow diagram of an illustrative embodiment of a method for displaying a virtual object to users. In block 602, a first version of a virtual object is displayed on a device. In block 604, a separation factor is determined between a first device and a second device. In block 606, a second version of the virtual object is displayed on the second device when the separation factor exceeds a separation threshold.

In this example, the second version of the virtual object includes an alternate presentation of the virtual object that is generated from different computer-generated content. More specifically, the computer-generated content delivered to the first device is different from the computer-generated content delivered to the second device. As a result, the second device displays the second version of the virtual object while the first device displays the first version of the virtual object.

In some instances, a tracking cookie is delivered to both the first device and the second device in order to monitor the relative locations of the first and second devices. If the separation factor changes such that it becomes below the separation threshold, then one of the first device and the second device may change the version of the virtual object being displayed, although this is optional and can be controlled by the server that delivers the computer-generated content to the first and second devices.

In another example, the separation factor is determined by determining a distance between the first and second devices. The distance can be determined, for example, from location data generated at the devices and transmitted to the server.

The separation factor may include a time period between a first interaction with a real world object by the first device and a second interaction of the same real world object by the second device. Separation in time can be a separation factor that can be compared to the separation threshold when determining which computer-generated content to deliver to the first and second devices as previously described. The separation factor and separation threshold can therefore be defined, by way of example only, in terms of time, distance, or both time and distance.

The virtual object displayed on the devices can be an augmented reality image that includes an image of a real world object that is augmented with computer-generated content. The difference between the first and second version of the virtual object may be determined by the difference between the computer-generated content delivered to the first device and the different computer-generated content delivered to the second device.

One of skill in the art can appreciate that an image of a real world object on one device may differ from an image of the same real world object on another device. As used herein, the image is considered to be the same when each device receives the same version of a virtual object even though the actual perspective of the real world object in the images may differ. In other words, two devices can be considered to be displaying the same virtual object even when the actual images displayed at the two devices may differ because the devices are not in the exact same location, but are separated by a separation factor that does not exceed the separation threshold.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
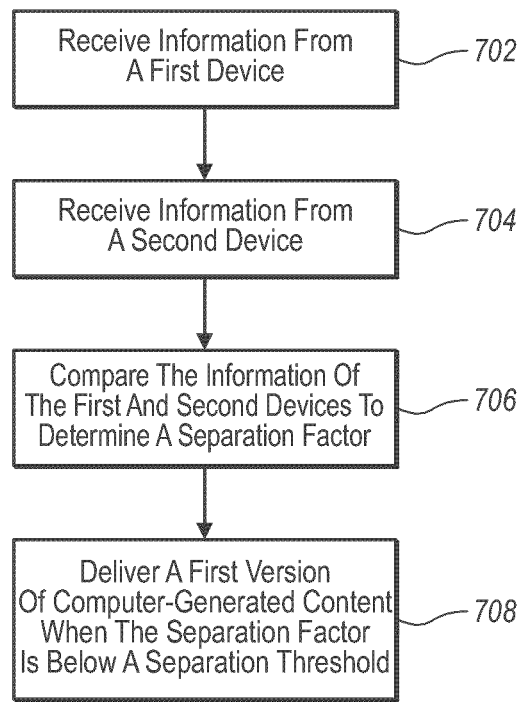
FIG. 7 is a flow diagram of an illustrative embodiment of a method for displaying an augmented reality image to multiple users.

FIG. 7 is a flow diagram of an illustrative embodiment of a method for displaying an augmented reality image to multiple users. After a server receives information from a first device in block 702, the server receives information from a second device in block 704. The information may include attributes that can be determined automatically from the first and second devices, from applications on the first and second devices, or from user input. The attributes in the information may identify a location and a time. The time can be associated with the location and/or with an object displayed on device at the respective location at the time.

In block 706, the server compares the information from the first device with the information from the second device to determine a separation factor. For example, the separation factor can be expressed in terms of location and/or time as previously described. In block 708, the server delivers a first version of the computer-generated content to both the first device and the second device when the separation factor is below the separation threshold. This ensures that, when the first and second device are relatively close in terms of location and/or time, both the first and second device display the same augmented reality image or at least the same computer-generated content (e.g., in a case where the devices are at substantially the same location, but displaying different images of different real world objects). This can avoid a fractured user experience when a user of the first device sees the augmented reality image displayed on the second device that is different from the augmented reality image displayed on the first device.

Alternatively, the server may deliver a second version of the computer-generated content to the second device when the separation factor is above the separation threshold. In this case, the server delivers different computer-generated content to the devices. Accordingly, different augmented reality images are displayed on the first and second devices when the separation factor is above the separation threshold.

By monitoring the locations of the first and second devices, the version of the augmented reality image displayed by the first and second devices can be readily determined.

Figure 8:
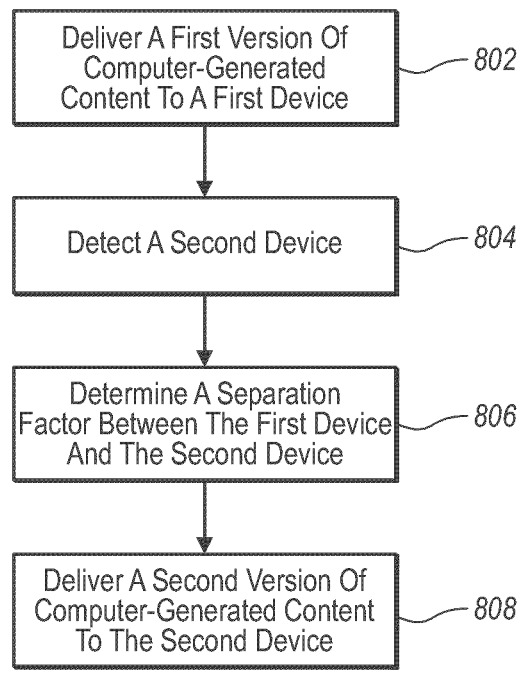
FIG. 8 is a flow diagram of an illustrative embodiment of a method for delivering computer-generated content to devices that interact with an object.

FIG. 8 is a flow diagram of an illustrative embodiment of a method for delivering computer-generated content to devices that interact with an object. This method can be used, by way of example only, to differentially test an advertising campaign or a web site by delivering different computer-generated content that is mixed with other content to generate different versions of a virtual object without providing a fractured user experience to users that interact with the virtual object.

In block 802, a first version of the computer-generated content delivered to a first device. The first version of the virtual object displayed at the first device may be generated by mixing an image of a real world object and the first version of the computer-generated content. The computer-generated content may be identified or selected using a location and/or orientation of the first device or from the object being displayed on the display of the first device.

In block 804, a second device is detected. The second device can be detected when a server receives information from the second device identifying at least its location. In block 806, a separation factor between the first device and the second device is determined. In block 808, a second version of the computer-generated content is delivered to the second device and displayed on the second device in the second version of the virtual object. More specifically, different computer-generated content is transmitted to the second device. The second device then displays the second version of the virtual object. The second version of the virtual object is generated from computer-generated content that is different from the computer-generated content used to generate the first version of the virtual object. Of course, the first version of the virtual object may be displayed on the second device to the second user if the separation factor falls below the separation threshold. Thus, the version of the virtual object displayed to the second user may change, although settings may dictate that the second user always receive the same version of the virtual object.

In one example, additional users may be detected. The version of the virtual object displayed on the devices of these additional users can depend on at least one of an analysis of separation factors among the devices or based on a testing balance associated with the first and second versions of the virtual object. For example, the devices can be grouped into two groups and the various separation factors can be distilled down to a separation factor between these two groups of devices. Based on how the group separation factor compares with the separation threshold (which may be different for groups of devices), the appropriate version of the virtual object is delivered by sending the appropriate computer-generated content and displaying it on the corresponding devices. Thus, the first group of devices may receive the first version while the second group of devices may receive the second version of the virtual object.

Figure 9:
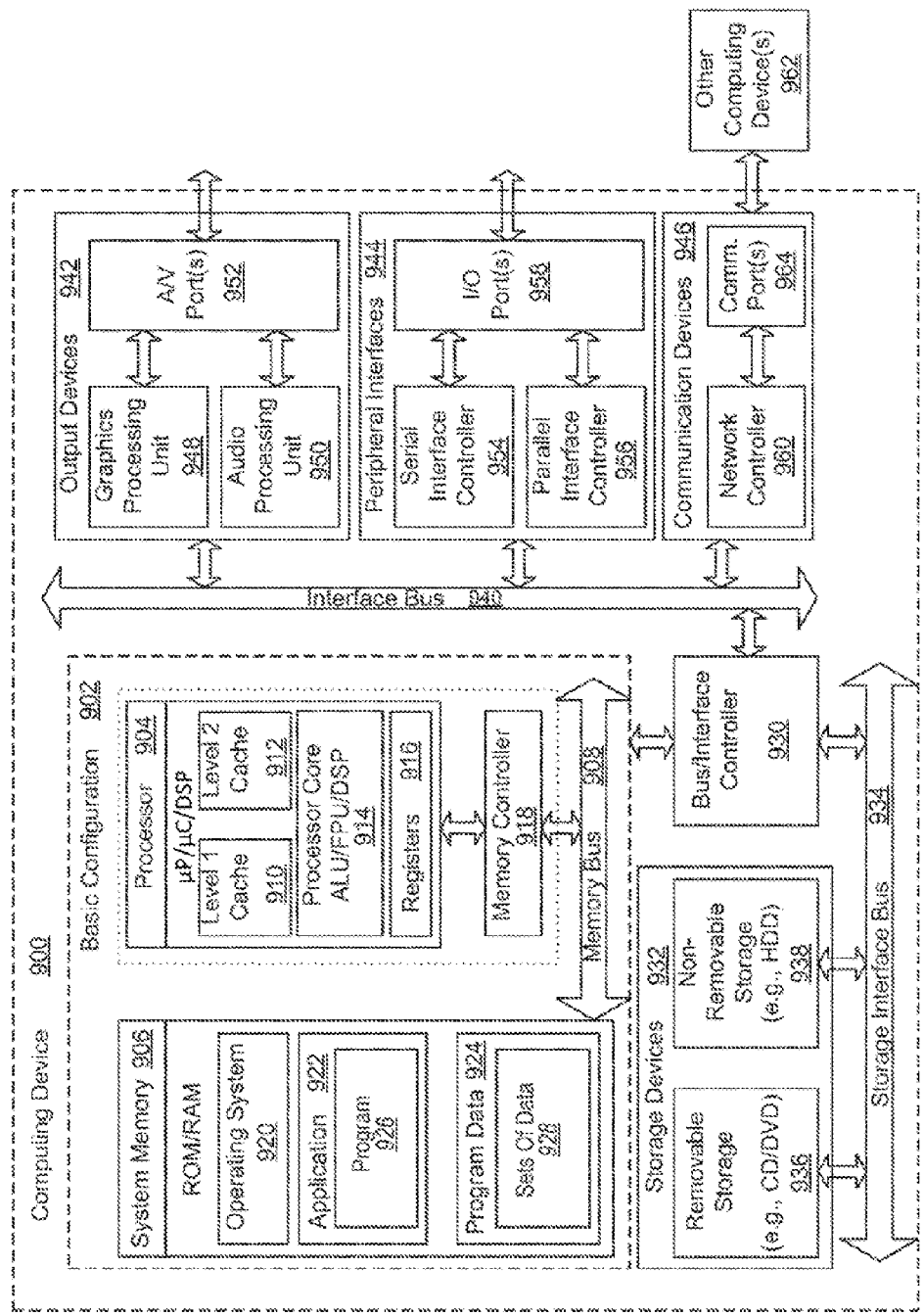
FIG. 9 shows an example computing device that may be used in determining and delivering computer-generated content that is presented on devices in accordance with the present disclosure.

FIG. 9 is a block diagram illustrating an example computing device 900 that is arranged delivering content, including computer-generated content to devices and/or to generating virtual objects for display on devices in accordance with the present disclosure. In a very basic configuration 902, computing device 900 typically includes processor 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. The processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a program 926 that is configured to use the processor 904 to determine and display virtual objects and to ensure that users viewing virtual objects do not have a fractured experience by viewing different versions of the virtual objects. Program data 924 may include sets of data 928 that have been processed by the processor 904 while executing the application 922 as will be further described below. The program data 924 may include, for example, sets of data 928 that are used to determine the computer-generated content that is delivered to devices, as further described herein. This described basic configuration 902 is illustrated in FIG. 9 by those components within the inner dashed line.

The computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics 948 and an audio 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to display a virtual object to users, the method comprising:
    sending a first version of the virtual object to a first device from a content module coupled to the first device via a server;
    causing the first version of the virtual object to be displayed on the first device, wherein the first version of the virtual object includes first computer-generated content;
    calculating, at the server, a separation factor for separation in distance between the first device and a second device and an amount of time between a first user's interaction with the first device while the first device displays a real world object included in the virtual object and a second user's interaction with the second device while the second device displays the real world object, the second device also being coupled to the content module via the server and the separation factor being calculated from first information from the first device and second information from the second device such that the separation factor expresses a difference in distance between the first device and second device and time between the first device's and second device's display of the real world object;
    comparing the calculated separation factor with a separation threshold in distance and time; and
    sending a second version of the virtual object from the content module to the second device when the separation factor exceeds the separation threshold, wherein the second version includes different computer-generated content from the first computer-generated content, and sending the first version of the virtual object from the content module to the second device when the separation factor is below the separation threshold; and
    causing the first version of the virtual object or the second version of the virtual object which is received from the content module to be displayed on the second device.

2. The method of claim 1, wherein causing the first version of the virtual object to be displayed on the first device comprises delivering a tracking cookie to the first device.

3. The method of claim 1, further comprising monitoring a location of the first device and a location of the second device.

4. The method of claim 3, further comprising determining the distance between the first device and the second device without revealing either a location of the second device or a location of the first device.

5. The method of claim 1, wherein the virtual object comprises an augmented reality image, wherein the first computer-generated content is merged into an image of a real world object to generate the first version of the virtual object displayed on the first device, and wherein the different computer-generated content is merged with the image of the real world object to generate the second version of the virtual object displayed on the second device.

6. The method of claim 1, further comprising determining whether to display the first version of the virtual object or the second version of the virtual object on the second device when the separation factor changes from exceeding the separation threshold to being below the separation threshold.

7. The method of claim 1, wherein the first information and the second information correspond to average traffic levels at a time of the first user's interaction with the first device and a time of the second user's interaction with the second device, respectively, wherein the separation factor is based on a difference in average traffic levels at the time of the first user's interaction and the time of the second user's interaction.

8. A method to deliver computer-generated content that is used to create augmented reality images which are displayed to multiple users at a device, the method comprising:
receiving first information from a first user at the device, wherein the first information identifies a first attribute of a first user interaction by the user with the device and wherein the first device displays an image of an object to the first user;
selecting and delivering first computer-generated content to the device so that the first computer-generated content is displayed to the first user at the device;
receiving second information from a second user at the device, wherein the second information identifies a second attribute of a second user interaction by the second user with the device and wherein the device displays the image of the object to the second user at the device;
comparing the first attribute with the second attribute so as to calculate a separation factor for separation in an amount of time between the first user interaction with the device and the second user interaction with the device such that the separation factor expresses a difference in time between the first user's operation of the device and the second user's operation of the device;
comparing the calculated separation factor with a separation threshold in time;
selecting the first computer-generated content when the separation factor is below the separation threshold and selecting second computer-generated content when the separation factor exceeds the separation threshold; and
delivering the first computer-generated content to the device when the separation factor is below the separation threshold, and delivering the second computer-generated content to the device when the separation factor exceeds the separation threshold,
wherein the first information and second information correspond to average traffic levels at a time of the first user interaction with the device and a time of the second user interaction with the device, respectively, wherein the separation factor is based on a difference in average traffic levels at the time of the first user interaction and the time of the second user interaction.

9. The method of claim 8, wherein:
the separation factor is defined as an amount of time between a last received first user interaction time with the device associated with the first user and a first received second user interaction time associated with the second user.

10. The method of claim 8, wherein the separation factor is defined by lack of user input at the device for a specific period of time.

11. The method of claim 8, further comprising:
monitoring a change in the second user interaction included in the second information;
delivering the first computer-generated content to the device when a comparison of the first information and the second information is below the separation threshold; and
delivering the second computer-generated content to the device when the comparison exceeds the separation threshold, wherein the second computer-generated content includes the image of the object merged with different computer-generated content than the first-computer generated content.

12. A method to deliver computer-generated content to devices that interact with an object, the method comprising:
delivering a first version of computer-generated content from a content module to a first device via a server, wherein the first version is mixed with an image of the object to display a first version of a virtual object on the first device;
detecting a second device;
calculating, at the server, a separation factor for separation in distance between the first device and the second device and time between a first user's interaction with the first device while the object is displayed on the first device and a second user's interaction with the second device while the object is displayed on the second device from first information from the first device and second information from the second device such that the separation factor expresses a difference in distance between the first device and the second device and time between the first user's and second user's respective interactions with the first device and second device;
comparing the calculated separation factor with a separation threshold in distance and/or time;
determining that the separation factor exceeds the separation threshold; and
delivering, from the content module, a second version of the computer-generated content to the second device after the determination that the separation factor exceeds the separation threshold, the second version of the computer-generating content including different computer-generated content from the first version of the computer-generated content, and wherein the second device mixes the image of the object with the second version of the computer-generated content to display a second version of the virtual object on the second device.

13. The method of claim 12, further comprising:
determining that the separation factor is less than the separation threshold; and
delivering the first version of the computer-generated content to the second device after the determination that the separation factor is less than the separation threshold.

14. The method of claim 12, further comprising:
detecting a plurality of users;
receiving information from the users; and
delivering either the first version or the second version of the computer-generated content based on a testing balance between the first version and the second version, the testing balance being determined by grouping the information from the plurality of users into groups of information, determining a plurality of separation factors between the groups of information, and identifying a most relevant separation factor between the groups of information.

15. The method of claim 12, further comprising:
determining that the separation factor has changed and is less than the separation threshold; and
delivering the first version of the computer-generated content to the second device after the determination that the separation factor has changed and is below the separation threshold.

16. The method of claim 12, further comprising delivering the first version of the computer-generated content to subsequent devices associated with separation factors, relative to the first device, that are below the separation threshold.

17. The method of claim 12, wherein the separation factor is based on a difference in average traffic levels at a time of the first's user's interaction with the first device and a time of the second user's interaction with the second device.

18. An apparatus to generate computer-generated content for inclusion in a virtual object, the apparatus comprising:
a server configured to communicate with a device over a network, wherein the server receives information from the device; and
a content module stored on a storage device accessible to the server, wherein the content module includes computer executable instructions that cause the server to:
identify first information from a first user at the device;
obtain, from the content module, a first version of a virtual object comprising first computer-generated content merged with an image of a real world object;
transmit the first version of the virtual object to the device for display to the first user:
identify second information from a second user at the device;
calculate a separation factor for separation in time between the first information from the first user at the device and the second information from the second user at the device:
compare the calculated separation factor with a separation threshold in time; and
transmit the first version of the virtual object to the device for display to the second user when the separation factor is below the separation threshold; and
obtain, from the content module, a second version of the virtual object comprising second computer-generated content merged with the image of a real world object and transmit the second version of the virtual object to the device for display to the second user when the separation factor exceeds the separation threshold,
wherein the first information from the first user identifies a first user interaction time that indicates when the first user interacted with the device and the second information from the second user identifies a second user interaction time that indicates when the second user interacted with the device, and wherein the separation factor calculates a difference between a first user interaction time and the second user interaction time, and
wherein the first information and second information correspond to average traffic levels at the first user interaction time and second user interaction time, respectively, wherein the separation factor is based on a difference in average traffic levels at the first user interaction time and second user interaction time.

19. The apparatus of claim 18, wherein the separation factor is defined as a period of time between a last received user interaction from the first user and a first received user interaction from the second user.

20. The apparatus of claim 18, wherein the separation factor is defined by lack of input at the device for a specific period of time.

21. The apparatus of claim 18, wherein the separation factor is based on a period of time that the first version of the virtual object is to be transmitted to the device, such that when the second user interaction time is determined to be received after the first version of the virtual object is no longer being transmitted, the second version of the virtual object is transmitted.

* * * * *